United States Patent [19]

Stenard et al.

[11] Patent Number: 5,415,336
[45] Date of Patent: May 16, 1995

[54] METHOD FOR PREPARING A COMPOSITE SURFACE FOR DIFFUSION BONDING

[75] Inventors: Steven C. Stenard, Scottsdale; Mohsen Sohi, Tempe; Donald R. Schuyler, Phoenix; Mani Janakiram, Tempe, all of Ariz.

[73] Assignee: AlliedSignal Inc., Morris Township, Morris County, N.J.

[21] Appl. No.: 978,574

[22] Filed: Nov. 19, 1992

[51] Int. Cl.$^6$ ............... B23K 31/00; B23K 35/22; B23K 103/16
[52] U.S. Cl. ................... 228/193; 228/205; 228/262.71
[58] Field of Search ............ 228/190, 193, 203, 205, 228/211, 124, 262–271; 148/DIG. 17, 669, 670; 29/DIG. 36, DIG. 7, 889.71; 72/700; 164/97

[56] References Cited

U.S. PATENT DOCUMENTS

| | | | |
|---|---|---|---|
| 3,862,489 | 1/1975 | Weisinger | 29/476.5 |
| 4,732,312 | 3/1988 | Kennedy et al. | 228/193 |
| 4,861,407 | 8/1989 | Volkmann et al. | 156/275.7 |
| 4,948,457 | 8/1990 | Cooper et al. | 228/206 |
| 4,969,593 | 11/1990 | Kennedy et al. | 228/193 |
| 4,982,893 | 1/1991 | Ruckle et al. | 228/193 |
| 4,998,578 | 3/1991 | Dwivedi et al. | 164/6 |
| 5,258,224 | 11/1993 | Langlois, Jr. et al. | 428/325 |

OTHER PUBLICATIONS

Metals Handbook Ninth Edition, vol. 5, "Abrasive Blast Cleaning" pp. 83–96, copyright 1982.
Metal Handbook Ninth Edition, vol. 5, "Cleaning and Finishing of Reactive and Refractory Alloys", pp. 650–668, copyright 1982.

*Primary Examiner*—Samuel M. Heinrich
*Attorney, Agent, or Firm*—Jerry J. Holden; James W. McFarland

[57] ABSTRACT

A method for preparing a machined surface of a composite article for diffusion bonding is provided. The method includes removing most of the exposed fibers by shot peening followed by acid etching. The acid etch may be followed by grit blasting and then another acid etch. After the method is applied to the surface, the article can be diffusion bonded to other composite article to form complex shapes.

11 Claims, No Drawings

METHOD FOR PREPARING A COMPOSITE SURFACE FOR DIFFUSION BONDING

TECHNICAL FIELD

The present invention relates to fiber-reinforced metal matrix composite articles comprised of a ceramic fiber as the reinforcing material and a titanium alloy as the matrix material, and in particular, to a method for preparing a surface of such a composite article having exposed fibers so that the article can be diffusion bonded to another titanium alloy article.

BACKGROUND OF THE INVENTION

Metal matrix composite articles combine the high strength and light weight of ceramic reinforcement fibers with the attractive properties of the titanium alloy matrix in which the fibers are embedded. Current methods for embedding the fibers within the matrix limit the final shape of the article to simple geometries such as a rectangular ring. To obtain more complex geometries requires machining the composite article and then diffusion bonding it with other composite articles to form the final shape. A problem with embedding ceramic fibers in a titanium alloy matrix is that the ceramic causes the titanium to react which weakens the alloy's bonding capability. One solution to this problem has been to coat the fibers. However, these coatings do not totally eliminate the reaction between the alloy and the fiber and further, after machining uncoated portions of the fibers are exposed. In addition, machining debris and coolant residues also reduce the effectiveness and strength of the diffusion bond.

Therefore, there is a need for a method for removing any exposed fiber or other contaminant from the surface of a machined composite article.

SUMMARY OF THE INVENTION

An object of the present invention is to provide a method for removing any exposed fiber or other contaminant from the surface of a machined composite article for subsequent diffusion bonding.

Another object of the present invention is to provide a method for forming metal matrix composite articles having complex shapes.

The present invention achieves this object by providing a method for preparing a machined composite surface. The method generally involves removing most of the fibers by mechanical means followed by chemical and thermal cleaning to remove the remaining debris, fiber/matrix reaction zone products and coolant residues. Once the surface is machined the article can be diffusion bonded to adjacent articles to form complex shapes.

DESCRIPTION OF THE INVENTION

Though the following description is made in reference to a composite article having a metal matrix of Ti-15-3 and silicon carbide fibers, the present invention is applicable to all titanium alloy matrices and ceramic fibers such as aluminum oxide and titanium diboride.

In the preferred embodiment, the composite article is securely mounted and then machined using diamond grinding wheels composed of a resin bonded diamond (100–320 grit at a concentration of 80–100 percent). Grinding wheels having other compositions such as silicon carbide, aluminum oxide or cubic boron nitride do not cut the very hard silicon carbide fibers effectively and result in excessive surface damage to the article. A liquid coolant is sprayed on the article during machining to prevent overheating. The coolant, preferably water with a rust inhibitor, should not contain oils which can contaminate the machined and cleaned surface during the bonding process, resulting in inadequate bond strengths.

The diamond grinding wheel should be rotated at 2000–3000 surface feet per minute. Slower speeds result in excessive grinding wheel wear and significantly higher speeds can overheat and damage the wheel. During the finish cuts, the depth of cut is best kept at less than 0.001 inches per pass and preferably at about 0.0002 inches to avoid damage to the fibers. The feed rate should be about 60–100 inches per minute as, higher rates cause excessive surface damage on the article.

After machining, the surfaces of the article having exposed fibers are shot peened. The shot peen must be controlled so that it breaks apart the portion of the fibers near the surface without damaging the underlying fiber or driving silicon carbide debris into the surface where it becomes difficult to extract. To achieve this end requires the proper selection of the following parameters, shot composition and size, the delivery pressure, time, nozzle stand-off distance, and angle to the surface being peened. The preferred parameters are steel shot at a nominal diameter of 0.017 inches delivered at a pressure of 50–80 psi (the resulting Alman intensity is near 10). A smaller shot size (0.007 inch diameter) tends not to break-up all the silicon carbide fiber while larger sizes (0.030 inch diameter or larger) create excessive damage to the underlying fibers as well as the machined surface. This operation is effective if performed for 8–12 minutes as the part is rotated at 8–16 feet per minute. To avoid metal peen entrapment of silicon carbide debris the nozzle should be positioned about 12 inches away from the surface. The shot peen is easily automated to cover a complex contoured surface by rotating the article while the shot peen nozzle is traversed normal to the machined surface.

Next, an acid etch is required to remove any remaining debris and to condition the surface for diffusion bonding. This step includes immersing the article in agitated methyl ethyl ketone, air drying, caustic bath immersion at about 140° F. for 5–10 minutes, water rinsing, acid immersion and agitation in an etchant solution comprising 3% HF:30% HNO$_3$:Water, a thorough water rinsing, and finally air and oven drying at 150°–300° F. for 1–20 hours depending upon the surface area and size of the article.

The surface is then grit blasted to remove silicon carbide fiber debris and residual fiber/matrix reaction zone products. Conventional grit blasting methods are employed such as the use of Silica sand delivered at a pressure of less than 40 psi to avoid excessive erosion of the machined surface. The time required is based upon the pressure selected but typically would be 2–3 minutes at a pressure of 25 psi as the part is rotated at a speed of about 8–16 surface feet per minute with the nozzle located 6–12 inches from the surface, with 12 inches being preferred. After the grit blast the acid etch as previously described is repeated.

The surface is then exposed, in a vacuum, to temperature in the range of 900° F. to 1300° F. for 2 to 20 hours. This heat treatment removes any remaining traces of volatile substances.

Completion of these steps results in a surface 0 containing a minimum amount of silicon carbide fibers and where the titanium metal has been adequately conditioned and cleaned for subsequent diffusion bonding.

Diffusion bonding is the preferred method for joining composite articles having matrices of a similar alloy. For titanium alloys this bonding includes applying sufficient external pressure to cause intimate contact of the surfaces to remove voids and metal asperities. The pressure is applied at high temperatures in a clean vacuum environment.

Vacuum hot pressing, electron beam welding or encapsulation within a metal can are all methods to provide the vacuum environment at the surfaces to be bonded. The assembly can then be hot isostatic pressed to consolidate and bond the machined surface to the mating structure.

Prior to hot pressing or electron beam welding, the mating surfaces, at the periphery of the articles to be joined, are machined to a good fit and then sealed by electron beam welding, thus providing the vacuum environment at the mating surfaces. The electron beam welding should include an adequate vacuum pumpdown time (2-16 hours) prior to making the final weld seal.

Alternatively, hot pressing could be used to seal the assembly while providing the necessary vacuum environment at the surfaces to be joined. Hot pressing consists of applying a suitable pressure (2,000 to 15,000 pounds per square inch) to the sealing surfaces at temperatures appropriate to the specific titanium alloy(s) used in the assembly. These temperatures would typically be from 1300° F. to 1650° F. for conventional titanium alloys and 1600°-1850° F. for alpha-two titanium aluminide type alloys. Hot pressing could also be used to bond the sub-assemblies, given a suitable component shape, size and fiber orientation.

The mating sub-assemblies are thus readied for joining by hot isostatic pressing. Conventional HIP techniques are used which includes heating the articles at heating rates in the range of 500°-1000° F. per hour, holding at intermediate temperatures (50°-400° F. below the maximum temperature), and then holding at the maximum temperature. Hold times are selected as a function of the temperature, the higher the temperature the less time required. Maximum temperatures range from about 1300° F. to 1650° F. for conventional titanium alloys and 1600° F. to 1850° F. for alpha-two titanium aluminide alloys. Pressures during the HIP process range from 5,000 to 30,000 pounds per square inch.

Once the bond has been completed at the HIP temperature the assembly is cooled at an appropriate rate to room temperature. The assembly is then heat treated to develop the desired combinations of strength, fatigue life, creep resistance and fracture toughness in the alloy matrix and adjacent structures. If there are two or more titanium alloys used, selection of that heat treatment must be accomplished in a manner that will enhance the performance of both alloys.

Various modifications and alterations to the above described preferred embodiment will be apparent to those skilled in the art. Accordingly, this description of the invention should be exemplary and not as limiting the scope and spirit of the invention as set forth in the following claims.

What is claimed is:

1. A method for removing exposed silicon carbide fiber embedded in a fiber-reinforced titanium or titanium alloy matrix composite article, said article having a surface through which a portion of said fiber is exposed comprising the steps of:
   (a) shot peening said surface to break apart said exposed fiber; and
   (b) acid etching said surface.

2. The method of claim 1 further comprising the steps of:
   (c) grit blasting said surface to remove silicon carbide fiber debris and residual fiber/matrix reaction zone products; and
   (d) repeating step (b).

3. The method of claim 1 wherein step (a) is performed with steel shot having a diameter between 0.007 inches and 0.030 inches delivered at a pressure of about 50 to 80 pounds per square inch.

4. The method of claim 3 wherein said shot diameter is 0.017 inches.

5. The method of claim 3 wherein step (a) is performed for a period of about 8 to 12 minutes and said shot is delivered from a distance of about a foot from said surface.

6. The method of claim 1 wherein step (b) further includes the steps of:
   immersing said surface in an agitated solvent;
   air drying said surface;
   immersing said surface in a caustic bath at about 140° F. for 5-10 minutes;
   rinsing said surface with water;
   immersing and agitating said surface in an etchant solution;
   rinsing said surface with water; and
   air and oven drying said surface at 150° F. to 300° F. for 1 to 20 hours.

7. The method of claim 2 wherein step (c) is performed with silica sand delivered at a pressure less than 40 pounds per square inch from a distance of about 6 inches to 12 inches from said surface.

8. The method of claim 7 wherein said pressure is 25 pounds per square inch and is applied for about 2 to 3 minutes as the surface is rotated at about 8 to 16 surface feet per minute.

9. A method for combining composite articles having simple shapes to form an article having a complex shape comprising the steps of:
   (a) providing at least two silicon carbide fiber reinforced titanium or titanium alloy matrix composite articles having simple shapes;
   (b) machining said articles so that when joined they form a complex shape, said machining exposing a portion of said fiber through at least one surface of at least one of said articles;
   (c) shot peening said surface having said exposed fiber to break apart said fiber;
   (d) acid etching said surface; and
   (e) diffusion bonding said articles together to form a single composite article having said complex shape.

10. The method of claim 9 further comprising between steps (d) and (e) the steps of grit blasting said surface to remove silicon carbide fiber debris and residual fiber/matrix reaction zone products; and then repeating step (d).

11. The method of claim 10 further comprising the step of heat treating said surface after repeating step (d).

* * * * *